United States Patent [19]
Melnik et al.

[11] Patent Number: 5,548,347
[45] Date of Patent: Aug. 20, 1996

[54] SINGLE PANEL COLOR PROJECTION VIDEO DISPLAY HAVING IMPROVED SCANNING

[75] Inventors: George A. Melnik, Montrose; Peter J. Janssen, Scarborough, both of N.Y.

[73] Assignee: Philips Electronics North America Corporation, New York, N.Y.

[21] Appl. No.: 278,366

[22] Filed: Jul. 21, 1994

Related U.S. Application Data

[63] Continuation-in-part of Ser. No. 218,853, Mar. 25, 1994, Pat. No. 5,410,370, which is a continuation of Ser. No. 990,776, Dec. 9, 1992, abandoned, which is a continuation-in-part of Ser. No. 927,782, Aug. 10, 1992, abandoned, which is a continuation of Ser. No. 634,366, Dec. 27, 1990, abandoned.

[51] Int. Cl.⁶ .................................................. H04N 9/31
[52] U.S. Cl. ................................. 348/761; 348/744
[58] Field of Search .......................... 348/744, 750, 348/751, 759, 761, 770, 771, 781, 782, 790, 766, 756; 353/30, 31, 33; 359/831, 837; 345/88; H04N 5/74, 9/31

[56] References Cited

U.S. PATENT DOCUMENTS

| | | | |
|---|---|---|---|
| 4,024,573 | 5/1973 | Carnes | 348/37 |
| 5,264,880 | 4/1993 | Sprague et al. | 353/31 |
| 5,387,995 | 2/1995 | Härig | 359/204 |
| 5,410,307 | 4/1995 | Hekstra et al. | 348/412 |
| 5,410,370 | 4/1995 | Janssen | 359/209 |
| 5,416,514 | 5/1995 | Janssen et al. | 348/261 |

FOREIGN PATENT DOCUMENTS

| | | | |
|---|---|---|---|
| 492721 | 7/1992 | European Pat. Off. | H04N 9/31 |
| 601666 | 6/1994 | European Pat. Off. | H04N 9/31 |
| 63-39294 | 2/1988 | Japan | H04N 9/31 |
| 2232268 | 12/1990 | United Kingdom | G02B 26/10 |

*Primary Examiner*—Wendy Greening
*Assistant Examiner*—Tuan V. Ho
*Attorney, Agent, or Firm*—Leroy Eason

[57] ABSTRACT

A color video projection video system in which a white light source is separated into red, green and blue bands with dark guard bands spaced therebetween. Scanning optics cause the colored bands to be sequentially scanned across a light valve, such as a transmission LCD panel. Prior to each color passing over a given row of on the light panel on the light valve, that row will be addressed, by the display electronics with the appropriate color content of that portion of the image which is being displayed. The image is projected by a projection lens onto a viewing surface, such as a screen. In order to optimize the color purity of the system when used with certain types of light valves, the intervals between each of the three colors is adjusted and scaled to the differing response times of the LCD panel for each of the colors. Additionally, color balance can be adjusted by changing the relative size of each color band with respect to the others.

21 Claims, 9 Drawing Sheets

SINGLE PANEL COLOR PROJECTION VIDEO DISPLAY HAVING IMPROVED SCANNING

CROSS-REFERENCE TO RELATED APPLICATION

This application is a continuation-in-part of application Ser. No. 218, 853 filed Mar. 25, 1994, U.S. Pat. No. 5,410,370, which is a continuation of application Ser. No. 990,776 filed Dec. 9, 1992, abandoned, which in turn is a continuation-in-part of application Ser. No. 927,782, filed Aug. 10, 1992, abandoned, which in turn is a continuation of application Ser. No. 634,366, filed Dec. 27, 1990, abandoned.

BACKGROUND OF THE INVENTION

This invention relates to color video projection systems and particularly to a single light valve color projection display having improved scan uniformity, linearity and color purity.

Projection television (PTV) and video color display systems, especially rear projection display systems, are a popular way to produce large screen displays, i.e. picture diagonal of 40 inches or greater, as the projection method provides displays which are lighter, cheaper, and often, superior in brightness and contrast, than non-projection based displays. Direct view cathode ray tube (CRT) based systems still dominate non-projection display technology, especially for, 9 inch to 30 inch color displays. In unit and dollar volume, the major market for all such displays is the consumer market. Size, cost, brightness, contrast and to a lesser extent, resolution are important characteristics of consumer designs. Because large direct view CRT based displays are heavier, bulkier, and more expensive, projection consumer displays dominate in sizes over forty inches.

Consumer projection technology has been dominated by a system employing three small monochrome type CRTs, one each for the red, green and blue portions of the image, and three projection lenses. These systems employ complex electronic circuits to distort the rasters of the images on at least two of the CRTs so that the composite projection image is converged. Effecting the proper adjustment of the electronics to obtain the converged image is a time consuming, tedious process. Further maintaining the quality of the convergence in the system after it has been set up at the factory remains an issue.

With a view toward the advantages of projection systems over direct view, but also some disadvantages, which were just detailed, engineers have been seeking alternative means of designing projection display systems. Accordingly, patents have issued and products have been produced employing three, matrix addressed, small light valve panels, most commonly TFT (thin film transistors) array LCD panels, instead of CRTs. These systems require only a single projection lens, if the light from three LCD panels are combined via the use of dichroic filters, a.k.a. dichroic mirrors. Convergence of the images is obtained by precision adjustment of the alignment of two of the panels. Initial interest in such displays has been their compactness when employed for front projection, and excellent contrast. These LCD panels are costly components, and consequently these LCD projectors cost more than CRT based projectors.

The present invention also differs from "single panel" designs which employ special light valve panels in which separate sub-pixels are used to modulate respective primary colors. Such color panel technologies have three limitations: firstly, the requirement for sub-pixels limits the effective image resolution. Secondly, white light falls on each of the sub-pixels, but only the color of the light for which the sub-pixel is designed is usable—the remainder is wasted. Thus a two-thirds loss of efficiency results. A further loss in efficiency is caused by the reduced effective aperture of the panel for a given polychrome resolution capability—because of the presence of the sub-pixels with attendant masks and traces. Thirdly, state of the art panel resolution is lower, or the panel cost is higher, because of using sub-pixels.

SUMMARY OF THE INVENTION

In the present invention, light from an intense white light source, for example an arc lamp, is collected, and separated using dichroic filters into primary colors—red, green and blue. The color separated light is caused to be formed into three sources, arrayed adjacently, such that each source appears to be narrow in the "vertical" direction and wider in the "horizontal" direction. Scanning optics are employed to cause three bands of light, one of each of the colors, to be positioned onto the rear of a transmissive light valve panel. This arrangement proves very effective when applied to twisted nematic LCD panel with TFT addressing. The scanning optics cause the bands of illumination to move across the LCD panel. As a band passes over the "top" of the active area of the panel a band of light of that color again appears at the "bottom" of the panel. Accordingly, there is a continuous sweep of three colors across the panel.

Prior to each color passing over a given row of pixels on the panel, that row will have been addressed with the appropriate information for that color. This means that each row of the panel will be addressed three times for each video field which is to be displayed. This can be accomplished by either using extra addressing lines to the panel array, and writing the horizontal rows in parallel, or by writing three separated rows sequentially, but at three times the field rate. The information being written to the separated rows must be appropriate for the color content of that portion of the image which is being displayed.

The simultaneous use of a large portion of the available red, green and blue light through a single light valve panel is an important feature of the present invention. This means that projection video systems based on the present invention have optical efficiencies at least comparable to that of three panel systems employing the same panel technology. Using only a single panel eliminates the need to mechanically converge the image, and further reduces system cost. Additionally, beam combining dichroic filters are not needed which leads to further cost savings.

The present invention also includes scanning optics that provide an extremely uniform scan of the three colors across the light valve. The scanning optics include three prisms, one for each color, which are mounted for rotation coaxially in side by side relation. Furthermore, using three prisms disposed side by side and adjusted in phase instead of a single prism to scan the color bars across the panel permits the time intervals between the colors to be staggered. The provision for staggered intervals will more efficiently accommodate certain types of light valves (LCD's in particular) whose rise and fall times are not the same for each color. Therefore, instead of equal 5 msec intervals between each of the colors the improved arrangement can allow, by way of example only, an 8 msec interval for the red bar, 4 msecs for the green bar and 3 msec for the blue bar. This will have the effect of improved red transmission and thus better color purity, particularly in the critical mixed colors (i.e. fleshtones), and improved overall transmission of single panel projectors constructed in this fashion. Other apparatus for addressing the three colors across the panel surface in unequal time intervals may also be utilized in accordance with this invention such as phased rotating prisms, mirrors, goniometric or rotating dichroics or filters. Also electronically controlled devices such as interferometers which scan in unequal intervals may also be used. Color balance may also be adjusted by this mechanism.

In the series of applications of which the present application is a part the means for scanning the color bands across the surface of the light valve have evolved. The first application in the series, application Ser. No. 634,366 filed Dec. 27, 1990 was directed to a single panel color projection video system in which the mechanism for scanning the bands of colors across the surface of the light valve is a four-sided prism which is used to scan all three colors. An improved scan arrangement was set forth in application Ser. No. 990,776 filed Dec. 9, 1992 in which improved scanned linearity was achieved by tie use of, rather than a single prism, three four-sided prisms, one for each color. The present application is directed to a further improvement in which the scanning of each of the three colors is optimized to the differing relaxation response times for different colors of certain light valves. This arrangement provides improved color purity in the video image. Mechanisms other than rotating prisms for providing the scanned bands are also disclosed. Finally, a mechanism for changing the color balance by changing the relative sizes of each color band is set forth.

BRIEF DESCRIPTION OF THE DRAWINGS

For better understanding of the invention, reference is made to the drawings which are to be taken in conjunction with the detailed specification to follow.

DESCRIPTION OF THE PREFERRED EMBODIMENTS

Figure 1:
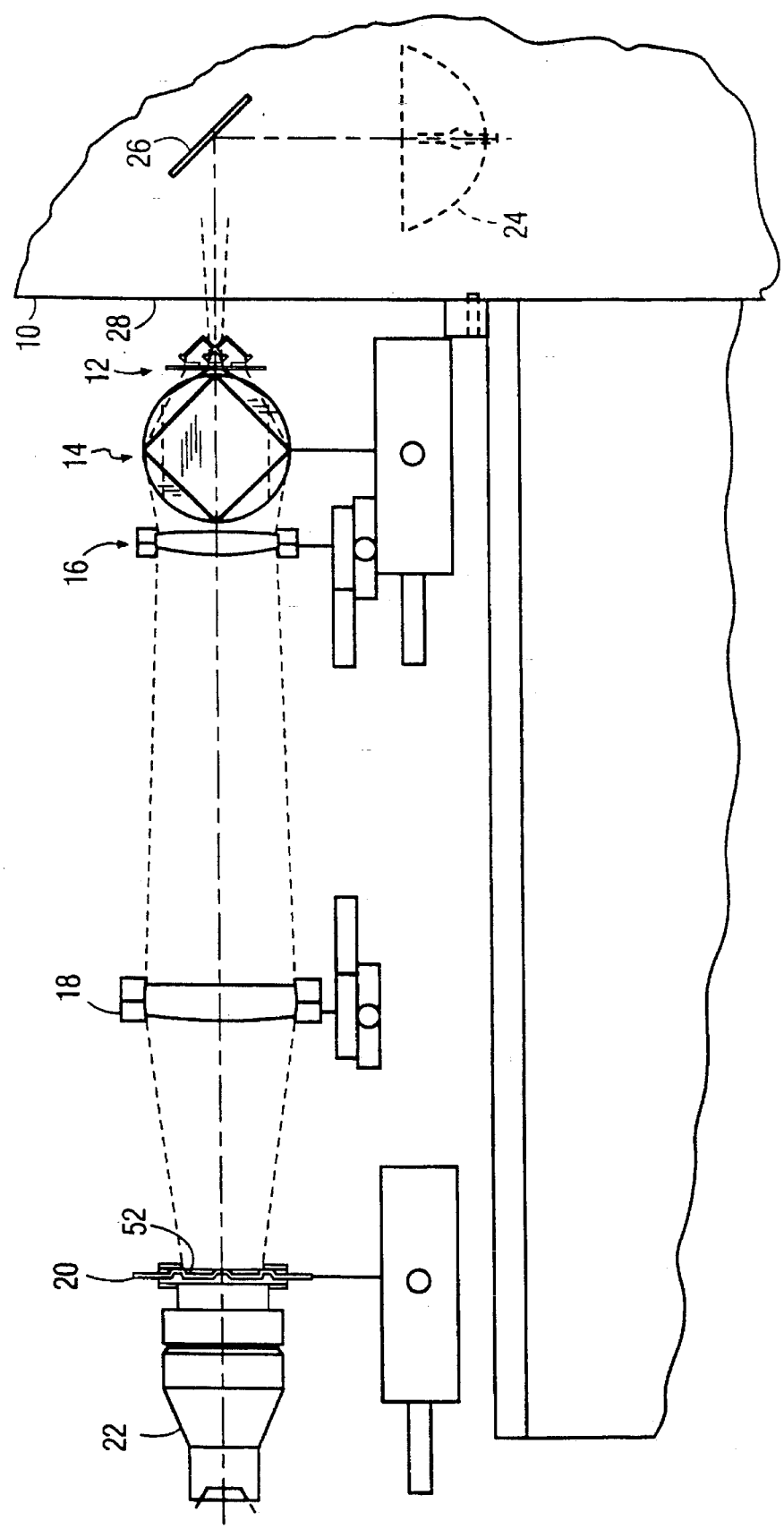
FIG. 1 is a side view of the optical system of the single panel color projection display constructed in accordance with the present invention.

FIG. 1 is a generalized overview of the optical system of the single panel color projection video display which includes a light box 10, a system of dichroic mirrors 12 for splitting the light into bands of red, green and blue, a rotating prism 14 for scanning the RGB bands, relay lenses 16, 18 a light valve 20 upon which is impressed the video signals and a projection lens 22. Light box 10 includes a lamp 24 of any suitable high intensity type such as a xenon arc lamp and an ellipsoidal reflector 25. The lamp output is directed to a "cold" mirror 26 which serves to reflect light in the visible spectrum while passing infra red light. Mirror 26 reflects the light from lamp 24 at a 90° angle and directs it to a series of optical lenses (not shown) which serve to modify the beam of light so that it is in the form of a generally uniform rectangular beam which exits light box 10 through an opening 28. Light box 10 may also include elements for absorbing ultraviolet radiation and cooling lamp 24. Lamp 24 has preferably a short arc length which facilitates its imaging and thus increases the brightness.

Figure 2:
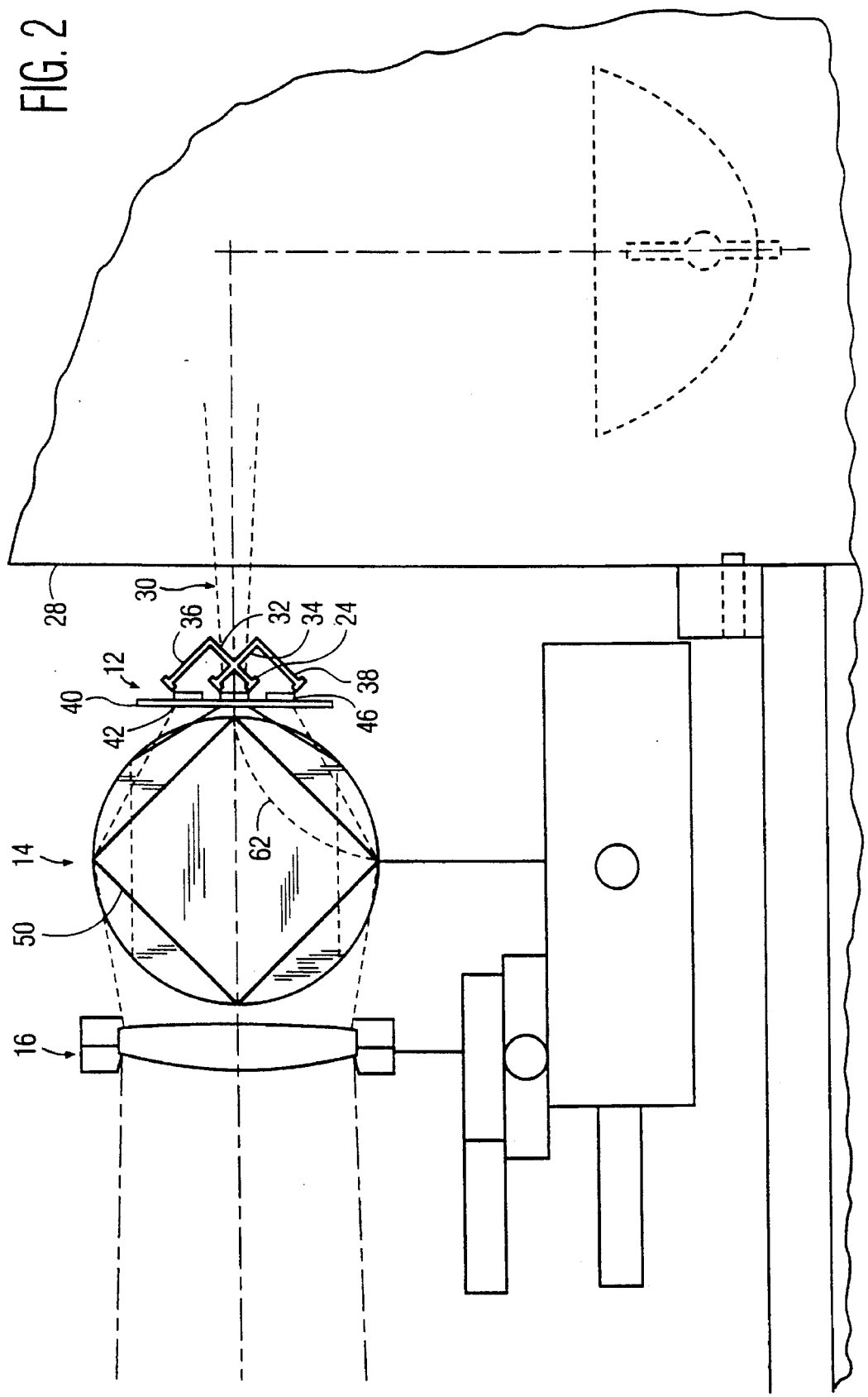
FIG. 2 is a side perspective view of the color separation and scanning mechanism of the present invention.

As is shown in detail in FIG. 2 the beam of light 30 emerging from opening 28 of light box 10 is directed to dichroic mirror system 12. Dichroic mirror system 12 serves to split beam 30 into separate beams of red, green and blue. Dichroic mirror system 12 includes centrally disposed crossed dichroic mirrors 32, 34, which pass only the green light component of beam 30 and reflect red upwardly and blue downwardly to mirrors 36, 38. An upper mirror 36 (which may also be dichroic) is constructed and arranged to reflect the red component of the light impinging thereon and the lower mirror 38 reflects only the blue component of the light impinging thereon. Accordingly, the system of mirrors 32, 34, 36 and 38 serves to split beam 30 into its red, green and blue components which are arranged in the form of a vertical array. A vertical aperture plate 40 includes 3 vertically disposed rectangular apertures 42, 44, 46 which also serve to rectangularize the three RGB light beams exiting the apertures with the red beam on top, the green beam in the middle and the blue beam on the bottom.

After leaving aperture plate 40 the red, green and blue beams impinge upon an optical scanning mechanism in the form of a rotating prism assembly 14. Prism assembly 14 includes a prism member 50 which has four equal flat sides (i.e. its cross section is square) and is rotated about its central longitudinal axis by a motor (not shown) which is driven in synchronicity with the video signals to light valve 20. The action of rotating prism member 50 is to cause the red, green and blue band of colors to be scanned downwardly (or upwardly) in a sequential manner by refraction. The sequentially scanned RGB bands are directed towards light valve 20 by relay lenses 16, 18. Lenses 16 and 18 constitute an anamorphic imaging system (of a 4×1 ratio) which images the light from apertures 42, 44, 46 onto light valve 20. As such, the rectangular active surface of light valve 20, which is a transmission LCD, receives sequential scanning of red, green and blue rectangular color bands. LCD panel 52 modulates the light impinging thereon in accordance with the desired input video information for the colors impinging on its various portions thereon. Thereafter, the video modulated sequential bands of light are projected upon a suitable viewing surface, such as a projection screen, by means of projection lens assembly 22.

The scan linearity of the optical system can be improved to a significant degree by making the surfaces of the revolving prism cylindrically concave as shown in the dotted surface 62 in FIG. 2. The preferred radius of curvature is on the order of 10 inches when the length between adjacent optical facets of the prism is 2.4 inches. For maximum projector performance the use of concave faces is preferred. Negative cylindrical faces can be achieved by direct fabrication (grinding), or by cementing plano-concave cylindrical lenses onto the four faces of a conventional prism. The refractive index of such facing lenses need not be unusually high, but the refractive index of the bulk of the prism should be high (N>1.6). If the refractive index is too low, then rays that otherwise would pass into one facet would exit through an adjacent facet. If this occurs, the phenomenon of total internal reflection (TIR) happens, and the final direction of the existing ray will not be in the proper direction for the light to be useful.

In the electronics for the device, separate red (R), green (G) and blue (B) signals are derived from the appropriate input source (broadcast, cable, direct) as is well known to those skilled in the art. However, in order to drive light valve 20 in accordance with the sequential color bands certain video signal processing is necessary. The parallel RGB signals must be serialized to a serial stream with, for example, the green signal delayed one third of a video field behind the red signal and the blue signal delayed one third of a video field behind the green signal. Thereafter, this serial stream must be processed to conform to the column driver and geometrical arrangement of light valve 20. For example if there are four column drivers there must be four parallel video signals. This signal processing utilizes the drivers of the light valve in a different manner than usually utilized for driving LCD displays. However, the same number and type of drivers are used so that the topology of the light valve need not be radically changed from that used with conventional video displays.

Figure 3:
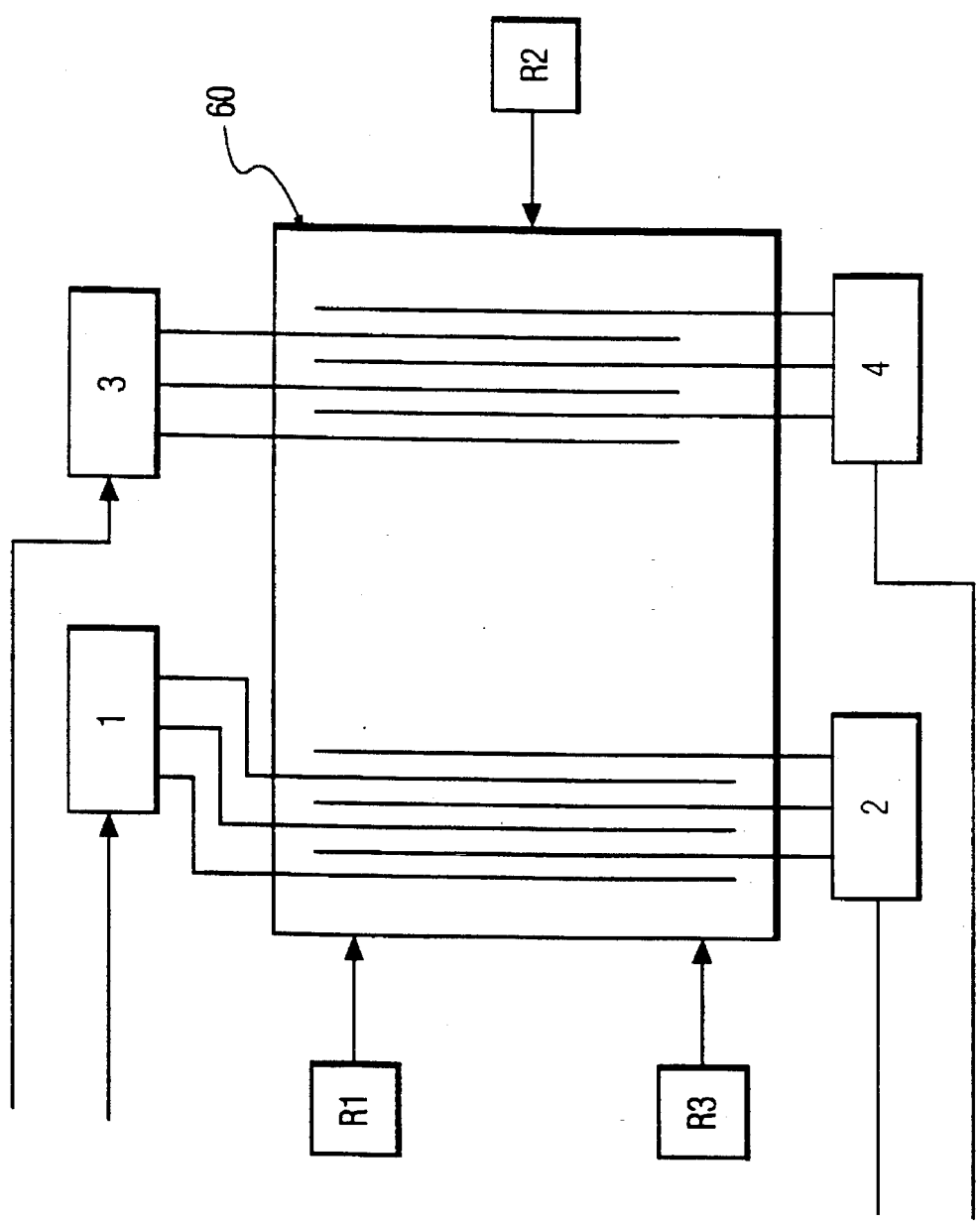
FIG. 3 is a diagram of the drivers of the light valve.

FIG. 3 is a generalized representation of the row and column drivers on a thin film transistor (TFT) LCD array which may be used in accordance with the invention. As is known in this art in such displays the rows are addressed sequentially with all of the TFTs in one row being turned on simultaneously through a common gate line by one of the row drivers R1, R2, R3. The individual pixels in a row are driven by a series of column drivers which may be arranged as illustrated in FIG. 3. The LCD array is laid out such that drivers 1 and 3 are connected to the pixels in odd-numbered columns while drivers 2 and 4 are connected to the pixels in even-numbered columns. The column drivers, which are basically memory devices, sample the incoming video signal and store the sampled value in the respective memory cell.

In standard monochrome operation the column drivers would be loaded in a sequential fashion: During the first half of the video line driver 1 receives all odd pixel values while driver 2 receives all even pixel values. Drivers 3 and 4 store the respective values during the second half of the line. After the video line has been completely written, the outputs of the driver are enabled while at the same time the according row is activated, resulting in a "dump" of the video information onto a specific pixel row on the panel. The whole LCD array is "reprogrammed" in this fashion once per video frame in the sequence video line 1, 2, 3, 4 . . . 478, 479, 480.

In the presented invention a different sequence is required with which the LCD array has to be programmed. The three color bands red, green, and blue are scanning vertically over the panel. During one video frame each row is illuminated by, in this realization, first passing red, then a green and finally a blue lightband. The programming of a particular row has to be performed in a way that e.g. the green values are loaded before the green lightband reaches this row but after the red band has passed by. Since all three color bands are illuminating the panel at any one time three rows have to be programmed during the time of one regular video line. Since the column driver arrangement does not allow independent programming of more than one row at a time this operation has to be performed sequentially.

In case of equally spaced color bands which scan in a strictly linear fashion with no overscan present and 450 rows (video lines) per frame the programming of the LCD panel would be performed in the following sequence (R=red, G=green, B=blue, (xx)=row number):

R(1), G(151), B (301), R(2), G(152), B(302), R(3) . . . R(150), G(300), B(450), R(151), G(301), B(1), . . .

The programming would track the color bands as they move over the panel. The numbers also indicate that the red video information lags 150 lines or ⅓ of a frame behind green which in turn lags ⅓ of a frame behind blue.

In case the rotation of the prism 14 causes non-linear scanning of the color bands, and/or overscan is introduced the timing of the two video signals and sequence will be modified to accommodate the changing scan speed and spatial separation of the color bands. This can be achieved by e.g. varying the system clock for each color according to the respective position on the panel (for the present row-driver arrangement), introducing a varying "blanking" time for the video or changing the line sequence to account for the non-linear behavior (which will require random access programming of the LCD panel rows).

Figure 4:
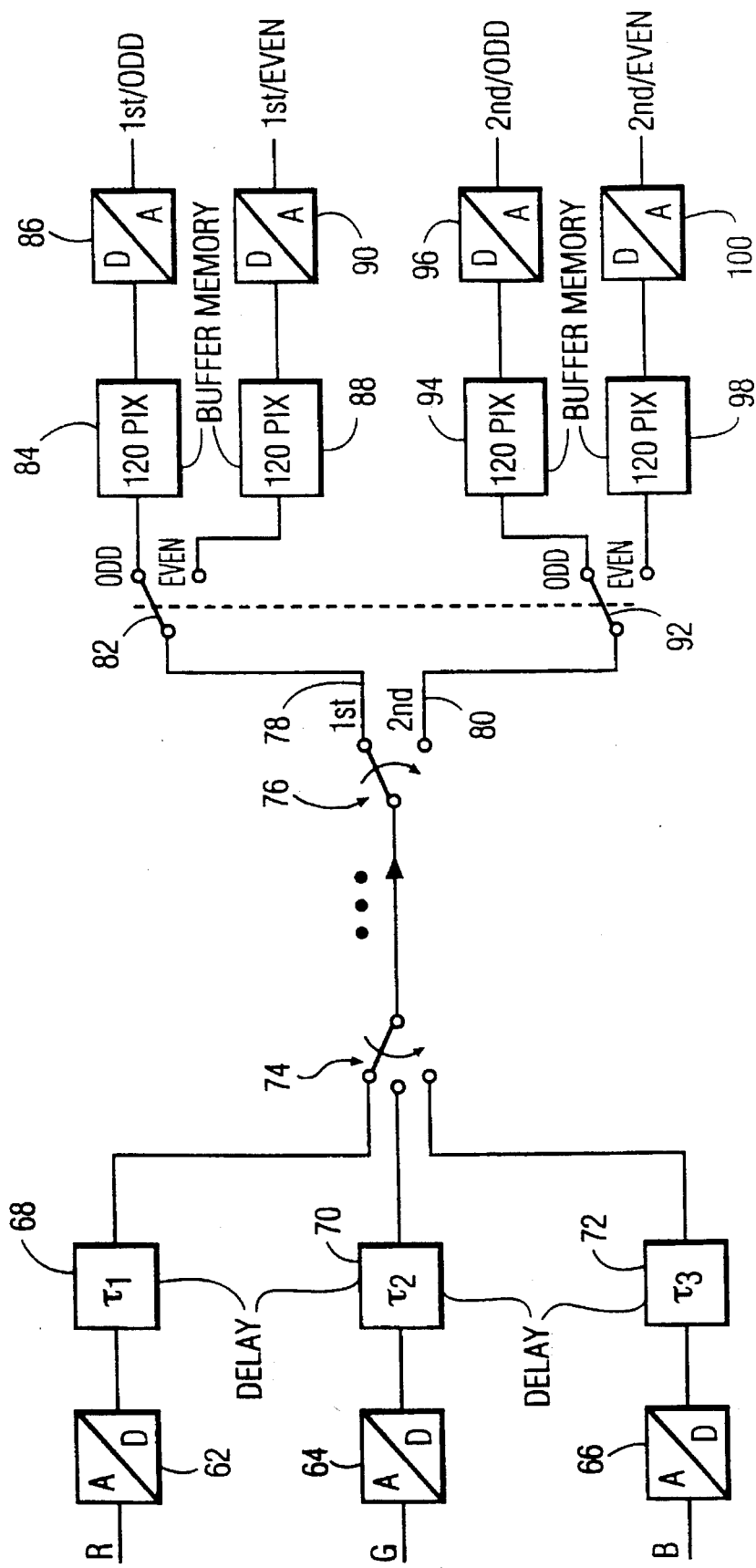
FIG. 4 is a diagram of the processing of the video signals for driving the light valve.

FIG. 4 illustrates the signal processing for the RGB signals in a diagrammatic manner. Each of the signals is input to A/D converters 62, 64 and 66 so that signal processing takes place in digital form. Thereafter the R signal is input to a first delay line 68 which will delay the red signal for a time $\tau_1$. The G signal is input to a delay line 70 which will delay it for a time $\tau_2$ and the blue signal is input to a delay line 72 to delay it a time $\tau_3$. The times $\tau 1$, $\tau 2$, and $\tau 3$ are selected according to the position and scan speed of the respective color band on the panel. Unless the scanning operation is performed completely linearly these delay times will vary during the course of one video frame, both absolutely and relative to each other.

The signals then pass to a switch 74 which selects each of the outputs of the delay circuits 68, 70, 72 sequentially so that the output of switch 74 is a serial stream with, for example, the pixels of the video lines in the aforementioned sequence. Thereafter as described below the signals are input to switching mechanism for applying the serialized delayed stream to the light valve.

The effective threefold increase of the field rate exceeds the speed capabilities of present column drivers. Additional demultiplexing and buffering is used to program the column drivers with four independent and parallel signals, each of which exhibits a data rate of only one quarter of the total rate.

The video stream passes to a switch 76 to separate the video stream into first and second streams 78, 80. Switch 76 is operated at a speed so as to divide the video stream into halves corresponding to the first and second half of each line. Thereafter the output of switch 76 is connected by a line 78 to a switch 82 which is operated at a speed so as to separate the odd and even pixels. The odd pixels are directed to a buffer memory 84 which will hold in this example 120 pixels (one quarter of one line), thereafter the output of buffer memory 84 is output to a D/A converter 86 whose output is in turn directed to column driver 1 as shown in FIG. 3. The even pixel stream is directed to a buffer memory 88 and D/A converter 90 and thereafter to column driver 2 of FIG. 3. The second halves of the video lines carried by line 80 are similarly processed by odd/even switch 92 with the odd pixels directed to buffer 94 and D/A converter 96 to column driver 3. Even pixels are directed through buffer 98 and D/A converter 100 to column driver 4.

It should be kept in mind that many other components may be substituted for the above described optical system. Other arrangements of components which provide sequential red, green and blue bands across the surface of a light valve may be utilized in conjunction with the present invention. For example, rather than a single source of white light, three sources of appropriately colored red, green and blue light may be utilized in conjunction with a scanning mechanism. Similarly, dichroic mirror system 12 and rotating prism 50 could be replaced by, for example, a rotating wheel of colored filters or a rotating drum of colored filters. Dichroic mirror system 12 could be replaced by a refractory prism and rotating prism 50 could be replaced by a polygonal mirror system. The scan direction need not be vertical but could also be horizontal or diagonal (with suitable light valve signal processing).

It is also noted that this invention is utilizable with any type of known electronic light valves such as transmission or reflection LCDs, ferroelectric devices, deformable mirrors and the like. Additionally, the light path could be straight as illustrated or folded in a more compact arrangement. The light valve could also be utilized in a direct view system. In certain applications a two color band rather than three band system could be used. A requirement for the light valve is that it have sufficient switching speed to be switched at about three times normal video rates as each pixel of the LCD is at various points in time a red, a green and a blue pixel. Techniques to speed the response time on a LCD include: heating the panel, low viscosity liquid crystal material, highly anisotropic material and/or making the liquid crystal layer thinner. Any combination of these techniques may be used.

The color band scanning system described above uses a four-sided prism of relatively high refractive index glass. However, a glass prism of sufficient size for this application is relatively heavy, and has a large amount of rotational inertia, thus requiring a relatively powerful motor to rotate it. Recently optical plastics such as PMMA have become available. These plastics are lighter than glass and are moldable which permits inexpensive mass production. Furthermore, since such plastics may be molded more complex shapes can be made than by the traditional grinding and polishing methodology used for optical glass prisms. A color band scanning system having improved scan uniformity is described below.

As is illustrated in FIG. 2 the three colors emerge from aperture plate 40, through apertures 42, 44, 46 which are arranged vertically. However, as is seen in FIG. 2 only the middle color band (green) is located on the rotational axis of scanning prism 14 with the upper (red) and lower (blue) bands off-axis. Due to the vertical arrangement the different color bands change their position relative to the prism. This action may cause color overlap or too large a gap between adjacent colors. This may impede color purity since it is difficult to compensate for this non-uniformity and address the light valve appropriately. The scanning system illustrated in FIGS. 5 through 7 provides an identical scan for each of the colors across the light valve, thus maintaining color purity.

Figure 5:
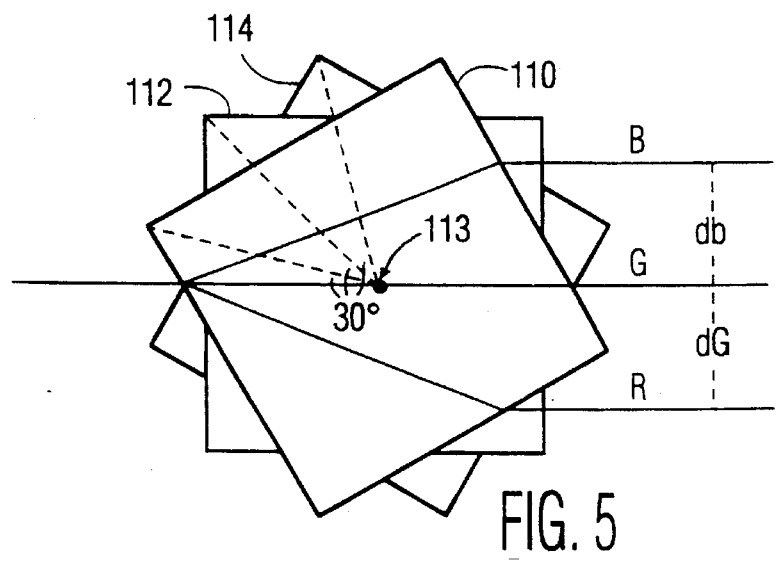
FIGS. 5 and 6 are side and front views respectively of a system which provides improved scan uniformity.
Figure 6:
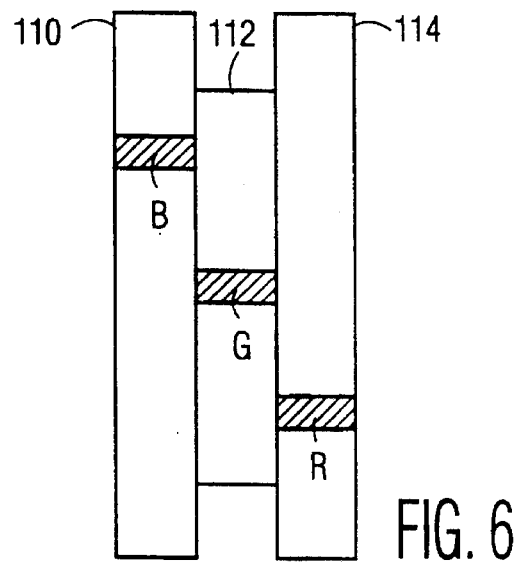
Figure 7:
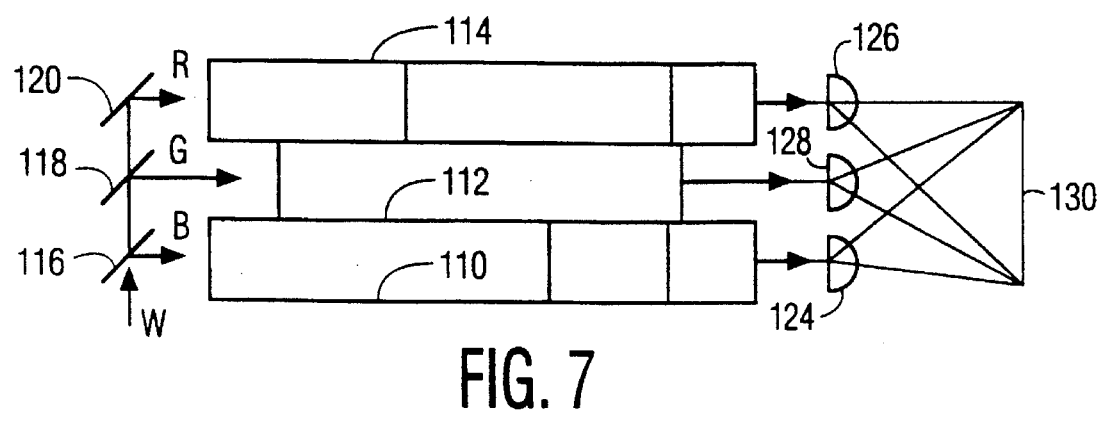
FIG. 7 is a top view of the scanning system of FIGS. 5 and 6 and shows the input system of dichroic mirrors and the output correction lenses.

As is seen in FIGS. 5 and 6, the single four-sided rotating prism 14 has been replaced by three narrower prisms 110, 112 and 114 which are disposed in side by side relationship. Each prism 110, 112, 114 acts only on a single color and each is coaxially mounted for rotation along rotational axis 113 and shifted 30 degrees in phase with respect to the next prism. As shown in FIG. 7 the input white light from the projection lamp is split into three colors by three dichroic mirrors 116, 118 and 120. The incoming white light first impinges upon mirror 116 which is mounted in front of prism 110. Mirror 116 reflects blue light to prism 110 and passes light of other colors. The light passed by mirror 116 next impinges upon mirror 118 which reflects only green light to prism 112. Finally, the light passed by dichroic mirror 118 impinges upon dichroic mirror 120 which reflects only red light to prism 114. Because each prism 110, 112, 114 is 30 degrees ahead of rotational phase with the preceding prism the output light is as is shown in FIG. 6 which consists of an upper band of blue, a middle band of green and a lower band of red in a continuing sweep. The arrangement of prisms provides that each of the scans of each of the colors is uniform. Prisms 110, 112, and 114 may be either manufactured individually, made of glass and cemented together or, if made of optical plastic such as PMMA may be molded as a single unit.

As is seen in FIG. 6 each of the three color bands is in a proper "stacked" vertical position but are offset horizontally from each other. In order to maximize the use of the light output each of the color bands should be aligned horizontally as well. Horizontal alignment is accomplished with the aid of correction lenses 124, 126 and 128 positioned at the output of prisms 110, 112 and 114 respectively. As is shown in FIG. 7 the correction lenses 124 and 126 serve to deflect inwardly the outermost beams towards a LCD panel 130 (or transfer optics) with the centermost beam left undeflected (but focused by lens 128). Thus horizontal alignment as well as uniform vertical scanning is accomplished by this arrangement. This maximizes the use of the light and increases the optical efficiency of the system.

Figure 8:
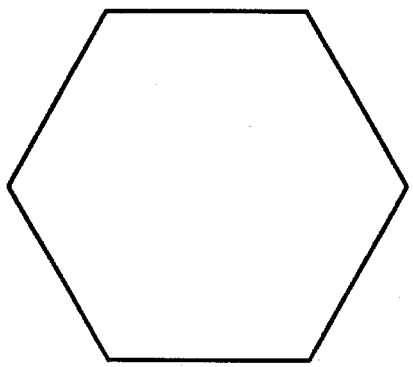
FIGS. 8 and 9 are sectional views of alternate embodiments of scanning prisms.
Figure 9:
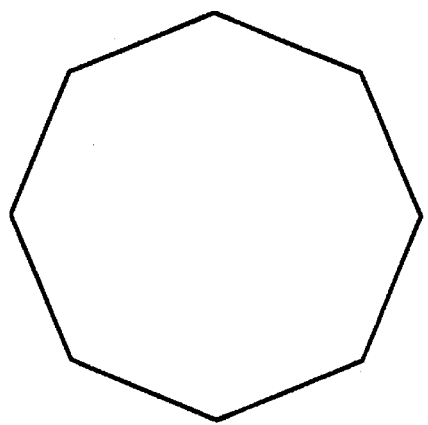
Figure 10:
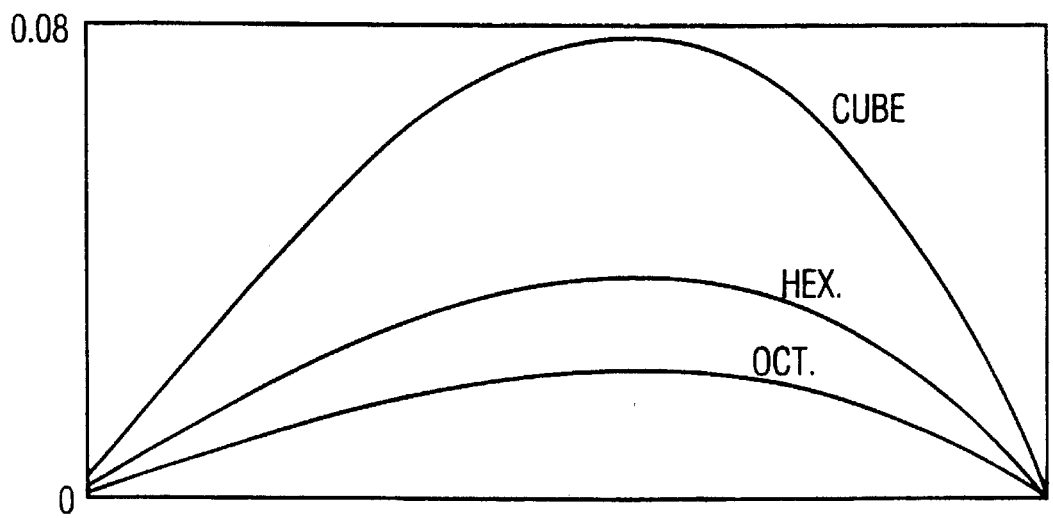
FIG. 10 is a plot of scanning non-linearity for four, six and eight sided prisms.

In addition to scan uniformity, linearization of the scan may also be accomplished by the use of scanning prisms having more than four sides, such prisms are shown in FIGS. 8 and 9. These may have six sides (FIG. 8) or eight (FIG. 9) sides. As is shown in FIG. 10 multiple sided prisms reduce the scanning error which begins to approach maximum linearity (perfect linearity would be shown by a completely flat line). In FIG. 10 the vertical axis represents the amount of deviation from linearity, with the horizontal axis representing rotation from the middle (0) to the top of the scan of each prism face. The light valve is reprogrammed to accommodate the additional color bands generated by these prisms. Furthermore, these multiple scanning prisms may also be used in a three prism side by side arrangement for extremely precise scanning of the color bands across the light valve.

Figure 11:
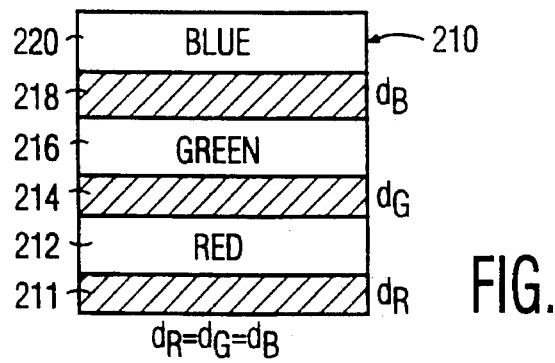
FIG. 11 illustrates the movement of the various color bands across the surface of the light valve by the scanning arrangement of FIGS. 5–7.

FIG. 11 illustrates the scan of the color bands across the surface of a light valve 210 by the three prism scanning mechanism shown in FIGS. 5–7. As is shown in FIG. 11, all three of the primary colors (red, green and blue), are scanned in the form of color bands across the face of light valve 210. However, any single line of pixels of the light valve 210 has only a single color applied to it at once. A band of red 212 is swept downwardly as shown in FIG. 11. Following red band 212 is a dark "guard" band 214 or space between red band 212 and a green band 216. Similarly, a guard band 218 follows green band 216 and precedes a blue band 220. When red band 212 has been swept downwardly past the bottom of light valve 210, another red band will appear at the top of the light valve and the sequence of color bands and guard bands is repeated. As shown in FIG. 11, in the usual mode, the guard bands 211, 214, 218 between adjacent colors are equal. At normal video rates the cycle time for scanning all the colors and guard bands across the light valve is 15 msec. Thus only 5 msec is allotted for any color band and adjacent guard band to pass any single line in the light valve.

Any of the scanning mechanisms described above may be used to create the scan of FIG. 11. In the arrangement of FIGS. 5–7 the scanning device consists of three four-sided prisms mounted coaxially in side-by-side relationship. Prism 114 acts on only the red colored light; prism 112 acts on green colored light; and prism 110 acts on the blue colored light. As is seen, each prism is shifted in phase 30° with respect to the other prisms. The color bars thus emitted from each prism are spaced equidistantly ($d_r=d_g=d_b$). Thus, when prisms 110, 112 and 114 rotate, the color bands pass the same spot on the panel at equal time intervals. However, such equal spacing of the color bands does not accommodate the relaxation response characteristics of many types of liquid crystal light valves.

When using liquid crystal display panels, more efficient transmission of the light and improved color purity is obtained by scaling the time intervals between the colors to the relaxation response time of the light valve for that particular wavelength (color). For example with respect to twisted nematic liquid crystal light valves it can be shown that the relaxation times (t) (i.e. the time it takes for the LCD to go from 10% to 90% transmission between crossed polarizers) for each of the three primary colors differ such that $t(red)>t(green)>t(blue)$. Accordingly, performance is enhanced if the scanning mechanism is designed to be able to adapt to the differing relaxation times of the LCD for different colors of illumination.

Figure 12A:
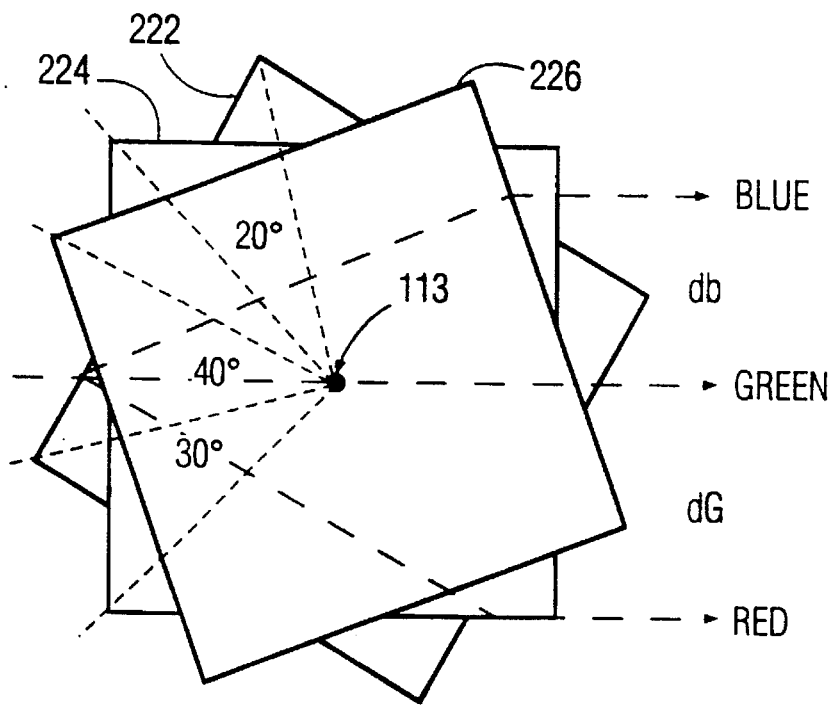
FIGS. 12a and 12b illustrate side and front views of a prism embodiment for providing staggered color intervals in accordance with the present invention.
Figure 12B:
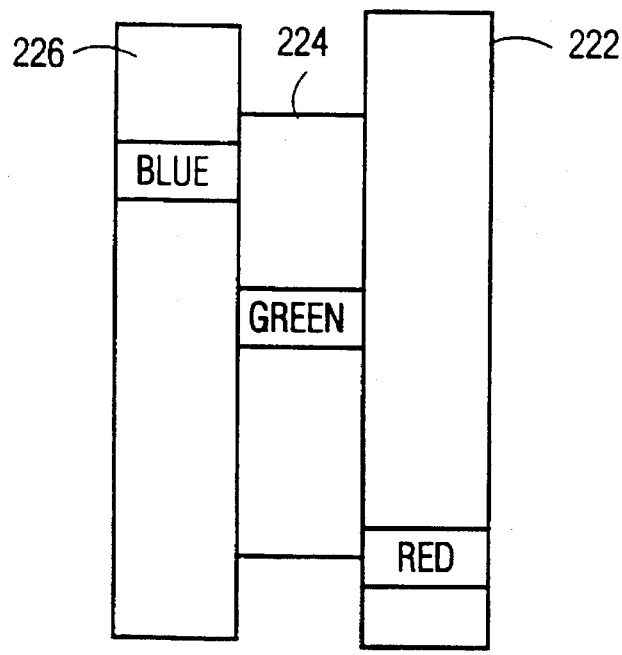

To implement the scaled color intervals and compensate for the unequal response of the liquid crystal to the differing wavelengths (colors) it is only necessary to change the phase angles between the faces of the three prisms used to scan the three colors. As shown in FIGS. 12a and 12b three four-sided prisms are again used, a prism 222 acts only on the red light, a prism 224 acts only on the green light and a prism 226 acts only on the blue light. Red prism 222 is rotated 30° in phase from green prism 224, but blue prism 226 is rotated only 20° in phase from green prism 224. This, in turn, orients blue prism 226 at 40° from red prism 222 such that the emitted color bars are no longer spaced equidistantly. This phase adjustment may also be used with prisms having more than four sides such as the prisms illustrated in FIGS. 8 and 9.

Figure 13:
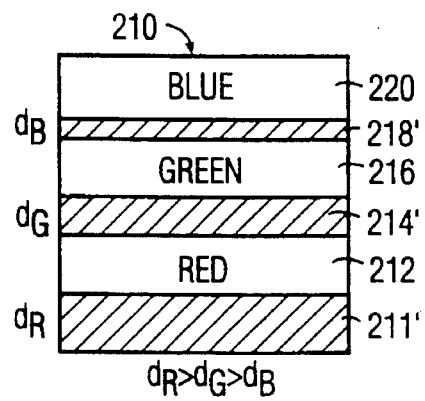
FIG. 13 illustrates the movement of the various color bands across the surface of the light valve by the scanning arrangement of FIGS. 12a and 12b.

Compare FIG. 13, which illustrates the spacing between the color bands as caused by the scanning arrangement of FIGS. 12a and 12b, with FIG. 11 which illustrates the scan of the arrangement of FIGS. 5–7. As seen in FIG. 13, the distance (separation) ($d_B$) between blue band 220 and green color band 216 is less than that ($d_G$) between green band 216 and red color band 212 and again less than the separation between the red and blue color bands ($d_R$) (i.e. $d_r>d_g>d_b$). The duration (size) of each of the color bands 212, 216, 220 remains the same as in FIG. 11, it is the intervals (guard bands 211', 214', 218') therebetween that have changed.

When the prisms of FIGS. 12a and 12b rotate, the color bands do not pass the same spot on the panel at equal time intervals. Proper adjustment of the phase angles (the angles between the faces of the prisms) to compensate for the light valve response time for each wavelength (color) optimizes the transmission of each color and improves color purity. This is because the larger spacing $d_r$ between the red and blue bars accommodates the longer fall time t(red) of the LCD. Similarly, the fact that the spacing $d_b$ between green and blue is shorter is no detriment to color purity because the fall time t(blue) is nearly twice as fast as t(red).

Figure 14:
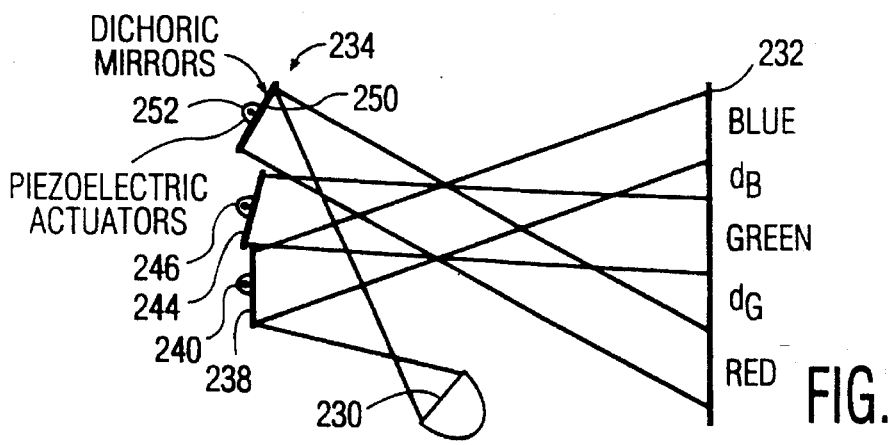
FIG. 14 is a schematic illustration of a second means for scanning the color bands with scaled intervals.

FIG. 14 illustrates another system for implementing scaled color intervals. This system consists of a source of white light 230 and a light valve 232. The light emitted by source 230 impinges upon three sets of pivotable dichroic mirrors that act to separate the white light of source 230 into three colors (red, green and blue), and scan same across light valve 232 with varying color intervals. The scanning of blue light is done by a dichroic mirror 238 which is pivotally mounted on a piezoelectric actuator 240. Dichroic mirror 238 reflects only blue light. The pivoting of mirror 238 by the action of piezoelectric actuator 240 sweeps the band of blue light downwardly across the light valve 232. Similarly, only green light is reflected by a dichroic mirror 244 which is pivoted by a piezoelectric actuator 246. Finally, only red light is reflected by a dichroic mirror 250, controlled by a piezoelectric actuator 252.

Figure 15:
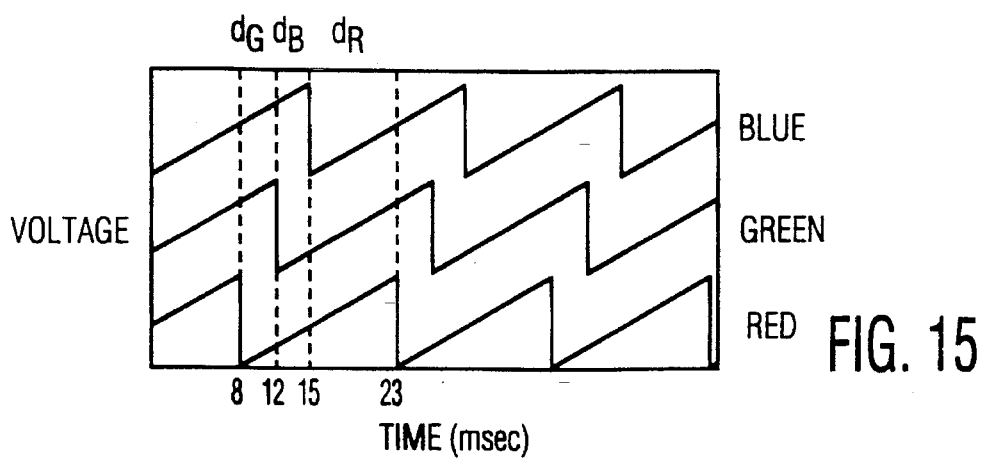
FIG. 15 is a plot of voltage versus time for the actuators of the scanning arrangement of FIG. 14.

Driving waveforms for piezoelectric actuators 240, 246 and 252 are shown in FIG. 15. As the voltage for each actuator ramps up, the piezoelectric actuator's crystals deform linearly causing mirrors 238, 244 and 250 to pivot and scan their respective color bands across the panel. When the voltage returns and drops (vertical lines in FIG. 15), the mirrors quickly return to the reset position, the top of light valve 232. As shown in FIG. 15, the scan of the red band begins at an elapsed time of 8 msec with the green scan beginning at 12 msec for a spacing ($d_G$) of 4 msec. The blue scan begins at 15 msec for a spacing ($d_B$) of 3 msec from the green scan and the red scan begins again at 23 msec for a spacing ($d_R$) of 8 msec ($d_R>d_G>d_B$). The rate of return can be made fast enough so that very little light of that color transmits to light valve 232 during the return. If the rate of return is too slow, a shutter wheel (not shown) can be added below or in front of each mirror to block the light during the return phase. Piezoelectrically controlled actuators are readily commercially available for this application. Additionally, the mirrors 238, 244 and 250 may also have optical power to focus the light on the panels. An adjustment of the phase of each waveform in FIG. 15 shown will adjust the time between the color bars in which light valve 232 relaxes.

The description of the means for scanning by the use of pivoting mirrors has been simplified for the purposes of clarity. In the system as described, efficiency is reduced by using dichroic mirrors with the piezoelectric actuators since light not reflected by each dichroic mirrors is lost. The efficiency can be improved by using parallel sets of dichroic mirrors to recover light not reflected by the first set of dichroic mirrors.

In the examples shown thus far the color bands all had the same dimensions. This reflects the situation where the light source radiates "white" light, i.e. the red, green and blue colors have equal energy. In general the light source will not be white and will radiate unequal energies in the three color bands. Consequently the colors in the picture could be wrong. This can be corrected by placing attenuating filters in the path of those beams that have "excess" energy. A better way is to increase the light throughput of the color that is "weak" and simultaneously decrease the light throughput of the color that is "strong". This can be achieved by increasing the width (height) of the band for the weak color while decreasing the width (height) of the strong color. Next to compensating for light source characteristics this procedure can also be used for giving the user control of picture color (tint) without reduction in overall brightness.

The scanning mechanism shown in FIGS. 14–15 can, when driven by a different set of driving signals, be used to vary the color balance of the projected image as well, This is accomplished by varying the length of each color relative to the other colors. Varying the length implies controlling the time between the beginning and end of the individual color band and is the same as changing the size of the particular color band. If, for example, a shift to a more red color balance is desired the driving waveforms to the piezoelectric actuators are adjusted so that the scan of red band is slower than that of the blue and green bands, (i.e. the distance between the vertical lines in the red scan of FIG. 15 is increased) thus allowing more red light to fall on the panel during each frame time. In a system utilizing a scanning prism a shift in color balance may also be accomplished by increasing the relative size (length in the scanning direction) of one band, such as by increasing the height of one of the apertures 42, 44, 46 (in FIG. 2) through which the various colors emanate.

Figure 16:
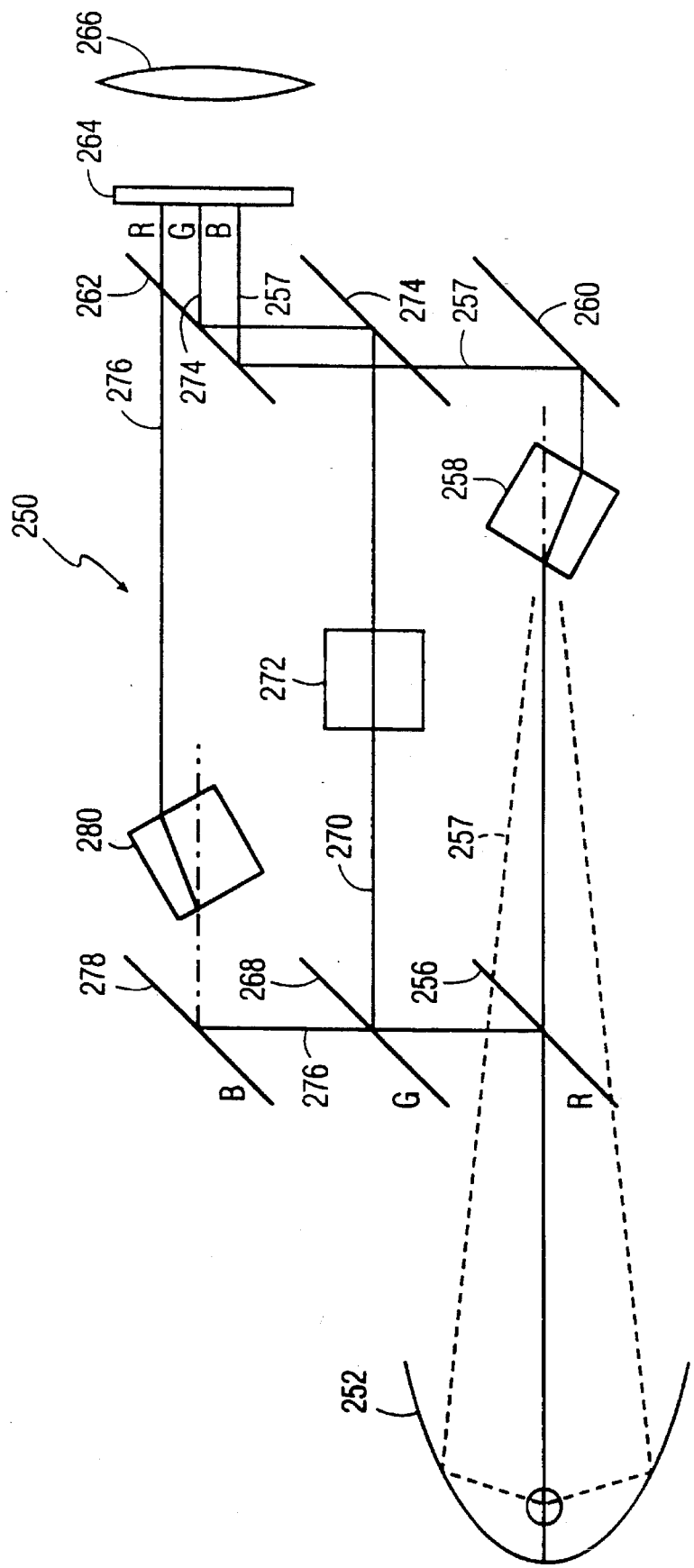
FIG. 16 illustrates another scanning arrangement for providing scaled color intervals using non-coaxially arranged prisms.

Another system for providing phase adjusted scanning of the light valve is shown in FIG. 16 which shows a scanning system 250 in which the prisms acting upon each color are non-coaxially mounted. In FIG. 16 the optical elements for shaping the light bands have been omitted for the purpose of clarity. Scanning system 250 is particularly useful in systems where high illumination levels are required, such as projectors used for theatrical presentations. This system is also suitable for use where the light valve used has a narrow angle of acceptance. Scanning system 250 includes a light source 252 in the form of a reflector lamp which emits white light. The light beam 254 emitted by lamp 252 first passes to a first dichroic splitting mirror 256 which passes red light and reflects light of other colors. A red light beam 257 which exits mirror 256 then impinges on a first rotating prism 258 which operates on red light beam 257 to scan the beam in a vertical direction. Light beam 257 then exits prism 258 and impinges upon a mirror 260 which reflects light beam 257 through a dichroic mirror 274 (which passes red light) to a dichroic mirror 262 which reflects red beam 257 to a light valve 264 which modulates the red light in accordance with the video information and passes same to a projection lens 266.

The green and blue light reflected from dichroic mirror 256 impinge upon a dichroic mirror 268 which acts to reflect green light and pass light of other colors. Accordingly, a "green" beam 270 is reflected by mirror 268 and impinges upon a rotating prism 272 which serves to scan green beam 270 in a vertical direction as shown in FIG. 16. The green beam 270 then passes to dichroic mirror 274 which reflects the green beam 270 to re-combining mirror 262 which reflects green beam 270 onto light valve 264.

The light beam which passes through dichroic mirror 268 forms a blue beam 276 as the red and green components have been subtracted from white beam 254 by the actions of mirrors 256 and 268 respectively. Blue beam 276 is thereafter reflected by mirror 278 to a rotating prism 280 which scans the blue beam and passes blue beam 276 to mirror 262 which passes blue beam 276 to light valve 264. By the action of rotating prism 280 blue beam 276 is also scanned in a vertical direction.

The action of prisms 258, 272 and 280 results in a scanning of bands of red, green and blue light across the light valve 264 which can be the same as the scans depicted in FIG. 11 and 13. If each of the prisms are disposed at equal phase angles (30°\30°\30°) with respect to each other, the scan will be that shown in FIG. 11. If on the other hand, each of prisms 258, 272, 280 are phased adjusted (i.e. 20°\30°\40°), the scan will be that of FIG. 13. Due to the fact that prisms 258, 272, 280 are separate, it is relatively easy to adjust their phase relationship. Prisms 258, 272 and 280 may be driven by a single motor or by three phase locked motors. The use of three separate motors permits the phasing (and thus the spacing between the various light bands) to be adjusted by automatic means. Furthermore, the fact that the three prisms are disposed in different locations in this system permits each of the prisms to be much wider than those shown in FIGS. 12a and 12b so that the light collection may be made more efficient without the need for light spreading elements.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and the appended claims.

What is claimed is:

1. A color video display system comprising:

a source of first, second and third colored bands of light, said first, second and third colored bands of light being separated by dark bands;

light valve means for modulating light impinging thereon in accordance with an input video signal;

means for moving said bands of a light sequentially across said light valve means, each of said colored bands being present on said light valve means at one time, said moving means including means such that the dark band between at least one of the first, second and third colored bands is different in size from that of the others; and means for addressing the portions of said light valve means with video information corresponding to the color of the light band impinging thereon so as to modulate the light of the light bands with said input video signal.

2. The display system as claimed in claim 1 wherein said means for moving said light bands comprise at least one rotating four-sided prism.

3. The display system as claimed in claim 1 wherein said means for moving said light bands comprise first, second and third prisms for said first, second and third colored bands respectively, said prisms being rotatable about a common axis and being adjusted in phase with respect to each other, the phase angles between each of said prisms being different from the others.

4. The display system as claimed in claim 3 wherein said prisms comprise four-sided prisms, the first prism being disposed at a phase angle of 20° with respect to the second, the third of said prisms being disposed at a phase angle of 40° with respect to the second.

5. The display system as claimed in claim 1 wherein said means for moving said bands of light comprise first, second and third independently pivotable mirrors; and means for driving said mirrors at different time intervals with respect to each other so as to scan said first, second and third colors across said light valve means.

6. The display system as claimed in claim 5 wherein said independently pivotable mirrors are driven by piezoelectric actuators activated by said mirror driving means.

7. The display system as claimed in claim 5 wherein said pivotable mirrors comprise dichroic mirrors.

8. The display system as claimed in claim 1 wherein said first, second and third colored bands of light comprise red, green and blue bands.

9. The display system as claimed in claim 8 wherein the dark bands on each side of the red band are the largest.

10. The display system as claimed in claim 1 further including means for varying the speed of movement of one of said first, second and third colored bands with respect to the others.

11. The display system as claimed in claim 1 further including means to vary the size of one of said first, second and third colored bands with respect to the others so as to adjust color balance.

12. The display system as claimed in claim 11 wherein said means for varying the size of said color bands comprise independently pivotable mirrors driven by piezoelectric actuators.

13. In a color video projection system having;
a source of first, second and third colored bands of light, said first, second and third colored bands of light being separated by dark bands; light valve means for modulating light impinging thereon in accordance with a video signal; means for moving said bands of light and said dark bands sequentially across said light valve means, means for addressing said light valve means with video information corresponding to the color of the light band impinging thereon so as to modulate the light valve with video information; and means for projecting the modulated bands of light onto a viewing surface; wherein the improvement comprises means such that the dark band between at least one of the first, second and third colors is different in size from that of the others.

14. The projection system as claimed in claim 13 wherein said means for moving said bands of light comprise at least one rotating four-sided prism.

15. The projection system as claimed in claim 13 wherein said means for moving said bands of light comprise first, second and third prisms for said first, second and third colored bands, said prisms being rotatable about a common axis and being adjusted in phase with respect to each other, the phase angles between each of said prisms being different from the others.

16. The projection system as claimed in claim 13 wherein said prisms comprise four-sided prisms, one of said prisms being disposed at a phase angle of 20° with respect to the other, the other of said prisms being disposed at a phase angle of 40° with respect to each other.

17. The projection system as claimed in claim 13 wherein said means for moving said bands of light comprise first, second and third independently pivotable mirrors; and means for pivoting said mirrors at different time intervals with respect to each other so as to scan said first, second and third colors at different time intervals across said light valve means.

18. The projection system as claimed in claim 17 wherein said independently pivotable mirrors are pivoted by piezoelectric actuators.

19. The projection system as claimed in claim 18 wherein said pivotable mirrors comprise dichroic mirrors.

20. The projection system as claimed in claim 13 wherein said first, second and third colored bands of light comprise red, green and blue bands.

21. The projection system as claimed in claim 13 wherein the dark band adjacent the red band is the largest.

* * * * *